3,814,813
PREPARATION OF SODIUM ALUMINUM HYDRIDE
George S. Fujioka, Walnut Creek, Calif., assignor to The Dow Chemical Company, Midland, Mich.
No Drawing. Filed Dec. 12, 1960, Ser. No. 75,440
Int. Cl. C01b 6/28
U.S. Cl. 423—644                2 Claims

ABSTRACT OF THE DISCLOSURE

This invention relates to the preparation and purification of metal hydrides and more particularly is concerned with a method of preparing ether soluble hydrides wherein purification of the hydride is achieved by massive dilution of an ethereal hydride solution with an aromatic organic solvent.

In the conventional preparation of metal hydrides, for example aluminum hydride by reaction of lithium aluminum hydride and aluminum chloride or the preparation of $NaAlH_4$ by the reaction of sodium hydride and aluminum chloride, the reaction normally is carried out in an anhydrous ether solvent (e.g. diethyl ether, tetrahydrofuran, etc.). The reaction is carried out under carefully controlled reaction conditions using precise amounts of prior prepared reaction initiators and starting materials. The ethereal reaction product solutions normally are found to contain considerable amounts of by-products, primarily metal chlorides, which are recovered as undesirable contaminants, along with the solid metal hydride product.

Now, unexpectedly it has been found in the method of the instant invention that by treating ethereal solutions of such impure metal hydrides with an aromatic solvent or by actually preparing the metal hydrides in an ether-aromatic hydrocarbon solvent mixture that relatively pure hydrides with low amounts of metal chloride contaminant can be obtained.

It is a principal object of the present invention to provide a method for the direct synthesis of high purity metal hydrides.

It is a further object of the present invention to provide a method for the preparation of high purity ether soluble metal hydrides utilizing an aromatic solvent along with ether thereby to promote the removal of undesirable contaminants from the hydride.

It is an additional object of the present invention to provide a process for the preparation of high purity metal hydrides which greatly facilitates the operative manipulations and promotes the recovery of the desired product by preventing or retarding the premature precipitation or polymerization of the desired hydride product in the reaction medium.

These and other objects and advantages will be apparent from the detailed description presented hereinafter.

In carrying out the process of the instant invention, an ethereal solution of a metal hydride or an ethereal reaction solution containing the starting materials for preparing a metal hydride is diluted with a miscible aromatic organic solvent thereby removing from the desired hydride product substantially all of the impurities normally associated therewith.

The ether-miscible diluents can be selected from any aromatic hydrocarbons and substituted hydrocarbons which will not undergo reaction with the ether-hydride solution or the ethereal solution of hydride producing reactants. Particularly useful diluents include for example, benzene, toluene, xylene and the like. The amount of the aromatic diluent to be used with a given amount of an ether hydride solution must be of sufficient amount so that the resulting solution contains at least 50 percent by volume of the aromatic member. Preferably, a solution containing at least 80 percent of the aromatic member will be used.

Advantageously, syntheses of a metal hydride can be carried out directly in the aromatic solvent-ether mixture. The use of these mixtures for a reaction medium is particularly preferred in the preparation of those metal hydrides, e.g. $AlH_3$, which are prone to premature precipitation and/or polymerization when made in an ether medium alone. However, the aromatic diluent conveniently can be added to an ether solution of an impure metal hydride after the initial preparative reaction has been complete. In those instances where such large amounts of solid inorganic impurities are formed, the dilution of the ether solution can be made either before or after these solids have been removed therefrom.

Likewise, an impure metal hydride product can be dissolved in an ether-aromatic solvent pair of proportions as set forth hereinbefore, and the purified hydride be recovered therefrom.

The solid, purified metal hydride can be recovered from the ether-aromatic solution, after removal of the solid inorganic contaminant therefrom, by conventional evaporation or crystallizing techniques. Particularly effective recovery is obtained by simply removing the solvent mixture, e.g. as by vacuum stripping. Alternatively, the lower boiling ether member can be fractionally distilled from the substantially solid impurity free solution whereupon precipitation of the purified hydride is obtained in the aromatic member. With controlled distillation rates, the amount of solid hydride which is obtained from solution can be limited. This, in turn, further controls purity. As the percentage of hydride recovery increases, the degree of product purity decreases.

To illustrate the utility of the method, relatively pure lithium aluminum hydride can be obtained from high chloride containing commercially available material by (1) dissolving the hydride in an anhydrous ether, (2) diluting the resulting ether solution with benzene to produce a benzene-ether solution containing at least about 50 percent by volume benzene, (3) fractionally distilling off a part of the ether and permitting the low-chloride containing purified lithium aluminum hydride to precipitate therefrom.

Sodium aluminum hydride can be prepared by (1) refluxing lithium aluminum hydride in an anhydrous ether such as tetrahydrofuran or diethyl ether containing sodium hydride dispersed in mineral oil, wherein the molar ratio of NaH to $LiAlH_4$ is at least about 1.1/1 and the volume of solvent is such that the molar concentration of $NaAlH_4$ does not exceed 0.05 M, (2) filtering the resulting product mixture, (3) adding an excess of benzene to the sodium aluminum hydride containing solution, and (4) fractionally distilling a portion of the tetrahydrofuran therefrom to crystallize the $NaAlH_4$ product in the benzene.

Additionally relatively pure aluminum hydride-diethyl ether etherate can be obtained by reacting aluminum chloride and lithium aluminum hydride in a 70 percent by volume benzene-30 percent by volume diethyl ether solvent mixture, filtering the resulting solid lithium chloride therefrom, and vacuum distilling the solvent from the product solution.

In all of the applications wherein this method is used, it is to be understood that critical reaction conditions as dictated by the properties and characteristics of the reactant and metal hydride products must be maintained. For example, for those hydrides which spontaneously decompose in the normal atmosphere, all reactions must be run in atmospheres of dry, inert gases, i.e., nitrogen, argon, helium and the like and the resulting products must be stored and handled under the same conditions.

The following examples will serve to illustrate further the method of the present invention but are not meant to limit it thereto.

EXAMPLE 1

Aluminum chloride (9.56 grams, 71.5 millimoles) dissolved in 62 milliliters of anhydrous diethyl ether was mixed, under a dry nitrogen atmosphere, with an ethereal solution of lithium aluminum hydride (8.14 grams, 214 millimoles dissolved in 200 milliliters of anhydrous ethyl ether). The resulting mixture was stirred with magnetic stirrer for about five minutes under a blanket of dry nitrogen.

After this time, the agitation was stopped and the bulk of the solid lithium chloride which was produced was permitted to settle to the bottom of the reaction flask. To the solution phase was then added about 2,500 millimeters benzene thereby providing a solution containing about 90 percent benzene and 10 percent ether by volume.

The so-diluted reaction solution was filtered, under dry nitrogen, through a medium porosity sintered glass filter thereby removing the precipitated solids.

The relatively pure solution of aluminum hydride was then subjected to distillation at about 50° C. under a partial vacuum to strip the solvent therefrom. The resulting solid aluminum hydride etherate recovered from this procedure was further devolatilized by subjecting it to high vacuum ($10^{-4}$ millimeter mercury pressure) at room temperature (23–26° C.). The resulting product, about 5.7 g. of an aluminum hydride etherate containing about 60 percent $AlH_3$ upon analysis was found to contain about 0.42 percent chloride and about 0.29 percent lithium. By comparison, an etherate prepared from diethyl ether alone contained more than 1 percent chloride contamination.

EXAMPLE 2

Utilizing the same quantities of starting materials as described in Example 1, another preparation of $AlH_3$ etherate was carried out utilizing as a solvent the mixture of the diethyl ether-benzene. The lithium chloride precipitated in and was removed from this mixture directly. Aluminum hydride-etherate of purity substantially the same as in Example 1 was then recovered from the solution utilizing the same recovery technique as described in Example 1.

EXAMPLE 3

A 50 gram sample of commercial lithium aluminum hydride containing 1.4 percent chloride contaminant was dissolved in 2,000 milliliters of anhydrous ether thereby producing a saturated solution of the hydride. This solution was filtered and about 2,000 milliliters of benzene were added to the filtrate with stirring. The resulting dilute solution was refluxed, a portion of the ether being controllably fractionally distilled therefrom whereupon a coarse, crystalline $LiAlH_4$ deposited in the refluxing solvent. Analysis of the crystalline hydride showed a residual chloride content of 0.13 percent.

EXAMPLE 4

Lithium aluminum hydride (40 grams, 95 percent purity) was refluxed in 2 liters of tetrahydrofuran containing a suspension of 100 grams of a 53 weight percent dispersion of sodium hydride in mineral oil. This mixture was refluxed for 8 days, the product mixture then filtered, and the filtrate concentrated to about 300 milliliters volume. Benzene then was added until the solution volume reached 800 milliliters. The resulting diluted solution was then heated to reflux and the tetrahydrofuran was fractionally distilled therefrom. Crystalline sodium aluminum hydride which was deposited thereby in the benzene solution was recovered by filtration. About 19 grams of the solid product was recovered which represented a recovery yield of about 35 percent. All operations were conducted in an atmosphere of dry nitrogen. Analysis of the $NaAlH_4$ prepared by this method compared favorably with that calculated for pure $NaAlH_4$ as shown in the following table.

| Percent | Calculated for $NaAlH_4$ (theo.) | Found for synthesized product |
| --- | --- | --- |
| Na | 42.59 | 42.0 |
| Al | 49.95 | 49.45 |
| H | 7.47 | 7.3 |
| C | | <0.1 |
| Cl | | <0.02 |
| Li | | <0.5 |

EXAMPLE 5

Lithium aluminum hydride, synthesized by the reaction of aluminum chloride with lithium hydride in an ether solution was purified by adding benzene to the filtered reaction mixture in sufficient quantity to give a solution containing about 80% by volume benzene. The ether-benzene solvent mixture was removed by vacuum stripping leaving a solid white crystalline lithium aluminum hydride product. This product upon analysis was found to be of relatively high purity and low chloride content as shown in the following table.

| | Percent |
| --- | --- |
| Li | 14.1 |
| Al | 66.39 |
| H | 10.35 |
| C | 1.95 |
| Cl | 0.42 |

Various modifications can be made in the method of the instant invention without departing from the spirit or scope thereof for it is understood that I limit myself only as defined in the appended claims.

I claim:

1. A process for the preparation of sodium aluminum hydride which comprises; (1) refluxing lithium aluminum hydride in an anhydrous ether solution containing sodium hydride, the molar ratio of said sodium hydride to said lithium aluminum hydride being at least about 1.1/1 and the amount of said ether being such that the molar concentration of sodium aluminum hydride product produced therein is less than 0.05, (2) filtering the resulting product mixture, (3) adding an aromatic organic hydrocarbon to the filtered sodium aluminum hydride containing solution, said aromatic organic hydrocarbon being inert to the ether solution of sodium aluminum hydride, the amount of said hydrocarbon being of such a quantity that the resulting solution of the ether-aromatic hydrocarbon diluent contains at least 50 percent by volume of the hydrocarbon and, fractionally distilling a portion of the ether therefrom thereby crystallizing sodium aluminum hydride in the aromatic hydrocarbon.

2. The process as defined in claim 1 wherein the ether is tetrahydrofuran and the aromatic hydrocarbon is benzene.

References Cited

UNITED STATES PATENTS

| 2,946,663 | 7/1960 | Good | 23—204 |
| 2,925,441 | 2/1960 | Brown | 23—14 |
| 2,930,675 | 3/1960 | Batha et al. | 23—14 |

OTHER REFERENCES

Chem. Absts., American Chem. Society, vol. 54, July-August 1960, abstract No. p16763h which abstracts Czech. patent to Vit et al., 89, 103, dated Mar. 15, 1959.

LELAND A. SEBASTIAN, Primary Examiner